US010752299B2

(12) United States Patent
Shimokawa et al.

(10) Patent No.: US 10,752,299 B2
(45) Date of Patent: Aug. 25, 2020

(54) SURFACE SHAPE VARIABLE DEVICE

(71) Applicants: TOYOTA JIDOSHA KABUSHIKI KAISHA, Toyota-shi, Aichi (JP); NATIONAL UNIVERSITY CORPORATION KANAZAWA UNIVERSITY, Kanazawa-shi, Ishikawa (JP)

(72) Inventors: Shinnosuke Shimokawa, Susono (JP); Eiji Itakura, Susono (JP); Hiroshi Tokutake, Kanzawa (JP); Atsumu Ohmae, Kanazawa (JP)

(73) Assignees: TOYOTA JIDOSHA KABUSHIKI KAISHA, Toyota-shi (JP); NATIONAL UNIVERSITY CORPORATION KANAZAWA UNIVERSITY, Kanazawa-Shi (JP)

( * ) Notice: Subject to any disclaimer, the term of this patent is extended or adjusted under 35 U.S.C. 154(b) by 543 days.

(21) Appl. No.: 14/678,472

(22) Filed: Apr. 3, 2015

(65) Prior Publication Data

US 2015/0284038 A1 Oct. 8, 2015

(30) Foreign Application Priority Data

Apr. 6, 2014 (JP) .................. 2014-078271

(51) Int. Cl.
*B62D 35/00* (2006.01)
*B32B 5/26* (2006.01)
(Continued)

(52) U.S. Cl.
CPC ............. *B62D 35/00* (2013.01); *B32B 3/16* (2013.01); *B32B 5/024* (2013.01); *B32B 5/26* (2013.01);
(Continued)

(58) Field of Classification Search
CPC .......... B62D 35/00; B62D 37/02; B64C 3/48; B64C 3/52; B64C 2003/445;
(Continued)

(56) References Cited

U.S. PATENT DOCUMENTS

2004/0130182 A1 7/2004 Bangle et al.
2005/0121945 A1* 6/2005 Browne ................ B62D 35/00
296/180.1
(Continued)

FOREIGN PATENT DOCUMENTS

JP 1993035565 U 5/1993
JP 2004516188 A 6/2004
(Continued)

*Primary Examiner* — Elizabeth C Imani
(74) *Attorney, Agent, or Firm* — Hunton Andrews Kurth LLP

(57) ABSTRACT

A surface shape variable device which comprises a board-like member comprising a plurality of strip elements capable of being elastically morphed which extend in parallel along a plane; and morphing control devises which elastically morph the strip elements due to buckling and the like toward a direction traversing the plane by applying stress to at least a part of the strip elements, wherein the strip elements are woven into a woven fabric-like state and extend intersecting with each other.

10 Claims, 9 Drawing Sheets

(51) Int. Cl.
*B62D 37/02* (2006.01)
*B32B 3/16* (2006.01)
*B32B 5/02* (2006.01)

(52) U.S. Cl.
CPC .......... *B62D 37/02* (2013.01); *B32B 2262/02* (2013.01); *B32B 2262/106* (2013.01); *B32B 2307/51* (2013.01); *B32B 2307/732* (2013.01); *B32B 2605/08* (2013.01); *B32B 2605/18* (2013.01); *Y10T 428/2481* (2015.01); *Y10T 428/24802* (2015.01)

(58) Field of Classification Search
CPC ....... B64C 2003/543; B32B 5/26; B32B 3/16; B32B 5/024; B32B 2262/106; B32B 2262/02; B32B 2307/732; B32B 2307/51; B32B 2605/08; B32B 2605/18; Y10T 428/2481; Y10T 428/24802
USPC ....................................................... 244/99.8
See application file for complete search history.

(56) References Cited

U.S. PATENT DOCUMENTS

| | | | |
|---|---|---|---|
| 2006/0192465 A1* | 8/2006 | Kornbluh | ................. B64C 3/48 |
| | | | 310/309 |
| 2010/0164478 A1 | 7/2010 | Miura | |
| 2010/0234779 A1* | 9/2010 | Asvadi | ................. A61H 1/008 |
| | | | 601/84 |

FOREIGN PATENT DOCUMENTS

| | | |
|---|---|---|
| JP | 2007-212436 A | 8/2007 |
| JP | 2010-500895 A | 1/2010 |
| WO | 98/24690 A1 | 6/1998 |
| WO | 9824960 A1 | 6/1998 |
| WO | 02/051688 A2 | 7/2002 |
| WO | 03068584 A1 | 8/2003 |
| WO | WO 03068584 A1 * | 8/2003 ............. B62D 35/00 |

* cited by examiner (A)

(B)

(A)

(B)

SURFACE SHAPE VARIABLE DEVICE

CROSS-REFERENCE TO RELATED APPLICATION

The present application claims priority to Japanese Patent Application No. 2014-078271 filed on Apr. 6, 20149, which is incorporated herein by reference in its entirety.

TECHNICAL FIELD

The present invention relates to a technique for morphing a surface shape of an object, and more specifically, relates to a surface shape variable device which morphs a surface shape of an object.

BACKGROUND ART

A structure to vary an outer shape of a mobile unit has been researched, aiming to alter aerodynamic characteristics of mobile units such as vehicles or an aircraft. For example, JP2004-516188 below (hereinafter referred to as Patent Document 1) describes a surface shape variable device which is configured to form an outer panel of a vehicle with a flexible material, and vary a shape of the outer panel by a mechanical position-adjusting device disposed inside the vehicle for the outer panel.

CITATION LIST

Patent Document

[Patent Document 1] JP2004-516188

SUMMARY OF INVENTION

Technical Problem

In a conventional surface shape variable device, a surface member such as an outer panel to be morphed is morphed by being moved toward a direction traversing the surface member. Therefore, it is necessary that the mechanical device which shifts the surface member is disposed adjacent to the surface member, even if the surface member itself to be morphed is extremely thin. Moreover, the mechanical device has a part capable of moving toward a direction in which the surface member is morphed. Accordingly, a conventional surface shape variable device has problems that it tends to have a limited space when it is disposed, and that the use thereof is restricted to those allowed by the presence and operation of the mechanical device. In other words, a conventional surface shape variable device cannot be applied to a use which does not allow the mechanical device to present and operate in the vicinity of the surface member.

The main object of the present invention is to provide a surface shape variable device capable of being applied to various use, with less spatial restrictions than that of conventional arts, by utilizing an elastic deformation phenomenon of a buckling or the like of a strip element.

Solution to Problem and Advantageous Effects of Invention

According to the present invention, the above described main object is achieved by a surface shape variable device characterized in comprising a board-like member which comprises a plurality of strip elements capable of being elastically morphed which extend along a surface in parallel, and a morphing control unit which applies a stress to at least a part of the strip elements to thereby elastically morph the strip elements which comprises said at least a part of the strip elements.

According to the above structure, a stress is applied to at least one part of the strip elements by the morphing control unit, so that the strip elements including the at least one part of the strip elements are elastically morphed, and accordingly, the board-like member is elastically morphed and the surface shape thereof is altered. Therefore, the morphing control unit does not need to press the board-like member toward the direction traversing the surface, but only needs to be disposed typically on an extension of a part of the strip elements. Accordingly, it is possible to reduce size of the surface shape variable device in the thickness direction of the board-like member, compared to that of a conventional surface shape variable device, to reduce the spatial restriction generated when the surface shape variable device is applied, and to expand the range of use to which the devise is applicable.

In a conventional surface shape variable device, a recovery of the surface member which has been morphed to its original shape depends on an elasticity of the surface member itself. Therefore, it is necessary that the surface member has a relatively high elasticity which allows the surface member to recover the original shape, and as a result, shapes before and after the morphing must be shapes determined depending on an elasticity of the surface member.

In comparison, according to the above structure, if the strip elements are released from the stress which has been applied thereto, the strip elements recover their original shape. Accordingly, for example, when a film member is bonded to the strip elements, it is not necessary that the film member itself has a high elasticity. Therefore, it is possible to reduce the extent that the shapes before and after the morphing are determined depending on an elasticity of a surface member.

Furthermore, in a conventional surface shape variable device, the shape of a pressing member of a mechanical device which comes into contact and press the surface member does not vary. Therefore, the shape of the pressing member determines the shapes of the part where the pressing member comes into contact, and of the surface member in the vicinity thereof. Thus, the shapes of such parts cannot be changed into any shapes which are not restricted by the shape of the pressing member.

In contrast, according to the above structure, since the strip member to be morphed is not morphed with the pressing member of the mechanical device, it is possible to avoid that morphed shapes of the strip member are restricted by a shape of the pressing member of the mechanical device.

Incidentally, in the above structure, "one surface" is not limited to a plane surface, but has a concept which comprises a curved surface. "Extending along one surface in parallel" has not only a concept that the plurality of strip elements extend completely within one surface, but has a concept which allows the plurality of strip elements to extend in a state slightly moved in a vertical direction to one surface. Furthermore, "extending in parallel" has not only a concept that the plurality of strip elements extend completely in parallel, but has a concept which allows the plurality of strip elements to extend with being slightly sloped to the others.

In addition, according to the present invention, in the above structure, said stress may be any of: a stress along a direction in which the strip elements extend; a stress along a direction of the width of the strip elements which is vertical to the direction in which the strip elements extend; a stress along a direction vertical to the direction of the width of the strip elements which is vertical to the direction in which the strip elements extend; a rotary stress around the direction in which the strip elements extend; a rotary stress around a direction along the direction of the width of the strip elements which is vertical to the direction in which the strip elements extend; a rotary stress around the direction vertical to the direction along the direction of the width of the strip elements which is vertical to the direction in which the strip elements extend; or a combination of two or three of these stresses.

According to the above structure, it is possible to elastically morph the strip elements according to a stress applied to other end of at least a part of the strip elements by the morphing control unit, to thereby elastically morph the board-like member by the elastic morphing of the strip elements, so that the surface shape thereof is altered. In particular, in a case where the other end of the strip elements is applied with at least a compression stress along the extending direction, the strip elements are elastically morphed toward a direction traversing the surface due to buckling, to thereby elastically curvedly morph the board-like member such that the center part of the board-like member is shifted to the direction which traverses the surface.

In addition, according to the present invention, in the above structure, said board-like member may comprise a plurality of first strip elements which extend in parallel along a first direction, and a plurality of second strip elements which extend in parallel along a second direction which traverses said first direction, and said first and the second strip elements may be woven into a woven fabric-like state.

According to the above structure, the board-like member comprises the first and the second strip elements each extending to a direction traversing the other, and these strip elements are woven into a woven fabric-like state. Thus, compared to a case having only the first or the second strip elements, it is possible to diversify the morphed shapes of the board-like member, and to enhance the intensity of the board-like member.

Also, according to the present invention, the above structure may be configured such that one of ends of said at least a part of the strip elements may be bound, and said morphing control unit shifts the other end of the strip elements relative to the one end.

According to the above structure, by shifting the other end of the strip elements relative to the one end by the morphing control unit, it is possible to apply a stress to the strip elements, and to presume a morphed shape or a morphed amount of the board-like member from a direction and an amount of a shift of the other end relative to the one end. Moreover, it is possible to reduce the number of the morphing control unit, compared to a structure in which the stress is applied to both ends of the strip elements by morphing control unit.

Also, according to the present invention, in the above structure, said morphing control unit may comprise a driving unit which drives the other end of the strip elements, and a detecting unit which detects at least one of an amount of shift of the other end driven by said driving unit and a stress applied to the strip elements by said driving unit.

According to the above structure, it is possible to variably control the morphing of the board-like member, by driving the other end of the strip elements by the driving unit. Also, since it is possible to presume a morphed shape or a morphed amount of the board-like member by detecting at least one of an amount of shift of the other end and a stress applied to the strip elements by the detecting unit, it is possible to accurately control a morphed shape or a morphed amount of the board-like member.

In addition, according to the present invention, the above structure may be configured such that the other ends of two or more strip elements are driven collectively by a single driving unit.

According to the above structure, since the other ends of two or more strip elements are driven collectively by a single driving unit, it is possible to reduce the number of the driving unit, compared to a case in which the other ends of the plurality of strip elements are each driven by an individual driving unit. It is also possible to simultaneously apply the same stresses to the other ends of two or more strip elements, to thereby simultaneously morph the two or more strip elements into identical shapes.

Also, according to the present invention, in the above structure, said driving unit may comprise a part consisting of at least one of a piezoelectric body, a shape-memory alloy, and a shape-memory resin.

According to the above structure, the driving unit is capable of applying a stress to the strip elements by driving the other end of the strip elements by a change of volume, length, or shape of a part consisting of at least one of the piezoelectric body, the shape-memory alloy, and the shape-memory resin. Therefore, it is possible to simplify the structure by reducing the number of necessary parts.

Also, according to the present invention, in the above structure, said surface shape variable device may have a morphing guide unit which guides the strip elements to be elastically morphed toward a predetermined direction traversing said surface when the other end of the strip elements are shifted so as to come close to the one end by said morphing control unit.

According to the above structure, when the other end of the strip elements are shifted so as to come close to the one end by the morphing control unit, it is possible to guide the strip elements so as to be elastically morphed due to buckling toward a predetermined direction traversing the surface by use of the morphing guide unit. Accordingly, it is possible to effectively prevent the strip elements from being elastically morphed toward a direction opposite to the predetermined direction when the strip elements are elastically morphed due to buckling.

According to the present invention, in the above structure, said surface shape variable device may also have a shape retaining unit which retains a shape of said board-like member by inhibiting the other end of the strip elements from shifting relatively to the one end.

According to the above structure, it is possible to retain a shape of the board-like member by inhibiting the other end of the strip elements from shifting relatively to the one end by the shape retaining unit. Thus, it is possible to effectively prevent the shape of the board-like member from being morphed, in a situation where the shape of the board-like member is to be retained, compared to a case where a shape of the board-like member is retained only by keeping the stress applied to the strip elements constant by the morphing control unit.

Also, according to the present invention, the above structure may be configured such that said at least a part of the strip elements comprise a part consisting of at least one of a shape-memory alloy and a shape-memory resin which is elastically morphed at least in a direction traversing said surface in response to a temperature; and said morphing control unit controls the temperature of the strip elements.

According to the above structure, it is possible to elastically morph at least a part of the strip elements toward a predetermined direction by controlling the temperature of the strip elements by the morphing control unit, or to make the strip elements restore the original shape. Moreover, since it is not necessary to shift the other end of the strip elements relative to the one end, it is possible to simplify the structure of the surface shape variable device, compared to a case of a structure which requires a driving unit to drive the other end of the strip elements.

Also, according to the present invention, in the above structure, a deformable film member may be bonded to at least one of the surfaces of said board-like member.

According to the above structure, it is possible to improve the smoothness of a surface of the part where the shape is morphed of the surface shape variable device, compared to a case in which a film member is not bonded to the board-like member. The film member is also capable of inhibit gas, liquid, or powder and granules from traversing and passing the board-like member, or from entering between the strip elements.

Also, according to the present invention, the above structure may comprise a plurality of said board-like members laminated with each other, and a plurality of morphing control unit each corresponding to each of the board-like members.

According to the above structure, the plurality of board-like members laminated with each other can be morphed by the morphing control unit each corresponding to each of the board-like members. Accordingly, it is possible to achieve morphed shapes which are difficult to be achieved in a case having only one board-like member. It is also possible to morph the board-like members laminated with each other into various shapes by changing number or combination of the board-like members to be morphed.

DESCRIPTION OF EMBODIMENTS

Hereinbelow, the present invention will be described in detail based on some preferred embodiments, referring to the attached Figures.

First embodiment

Figure 1:
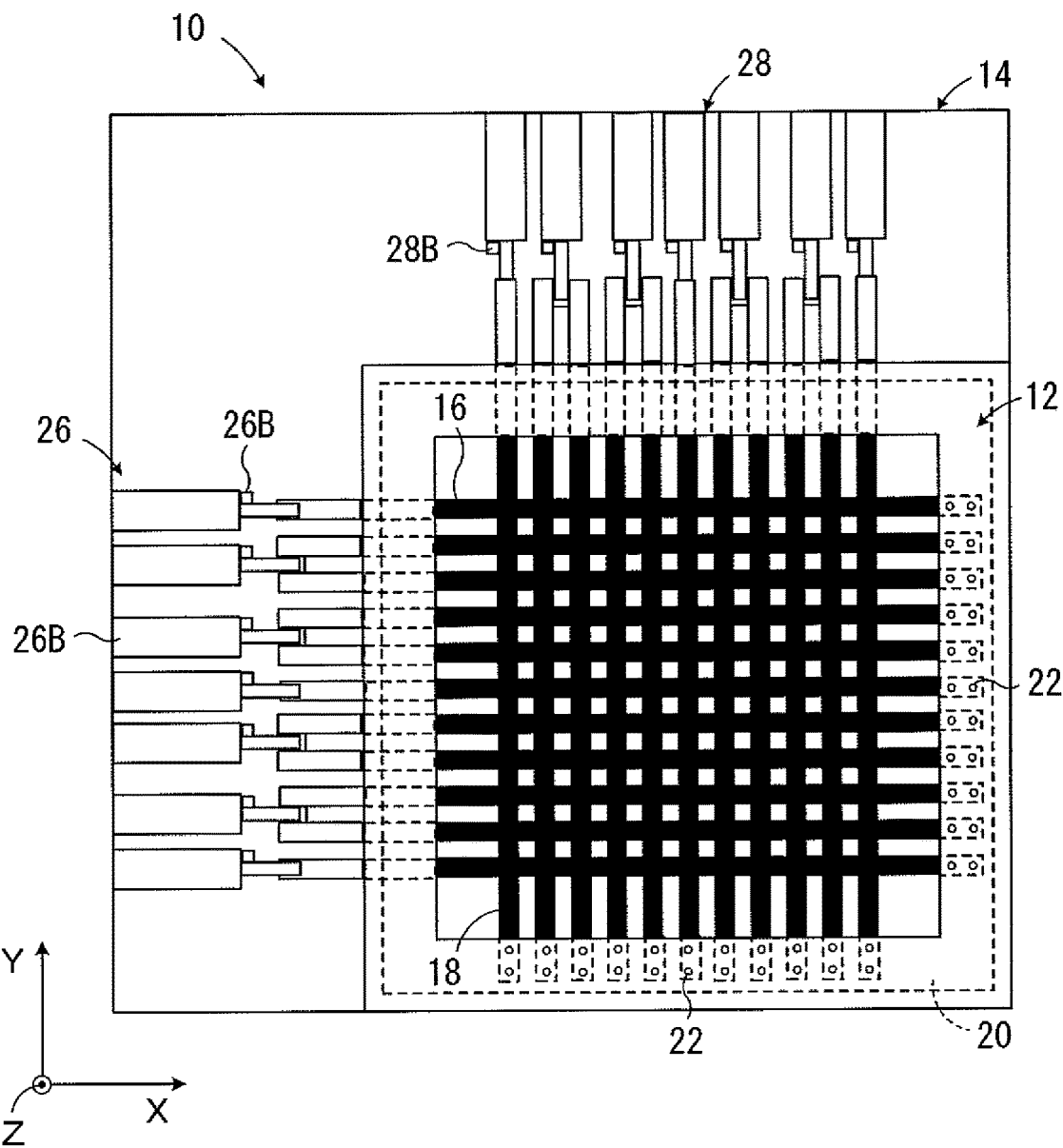
FIG. 1 is a plan view representing a first embodiment of a surface shape variable device according to the present invention with strip elements comprising a board-like member woven into a woven fabric-like state.
Figure 2:
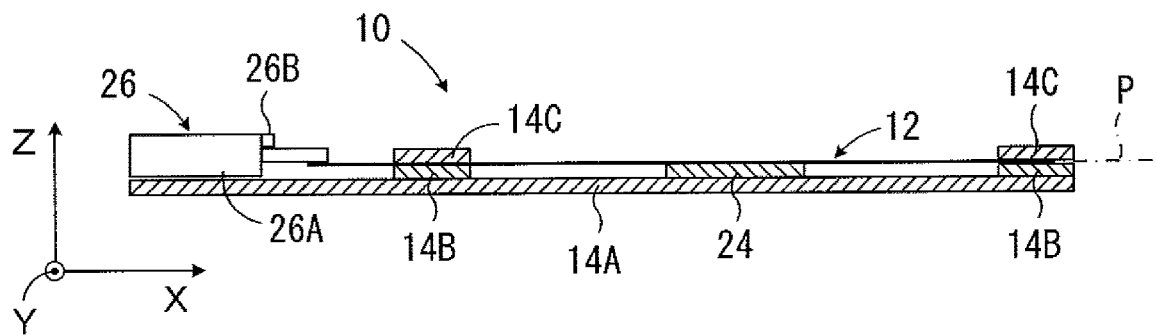
FIG. 2 is a vertical sectional view representing the surface shape variable device of the first embodiment.
Figure 3:
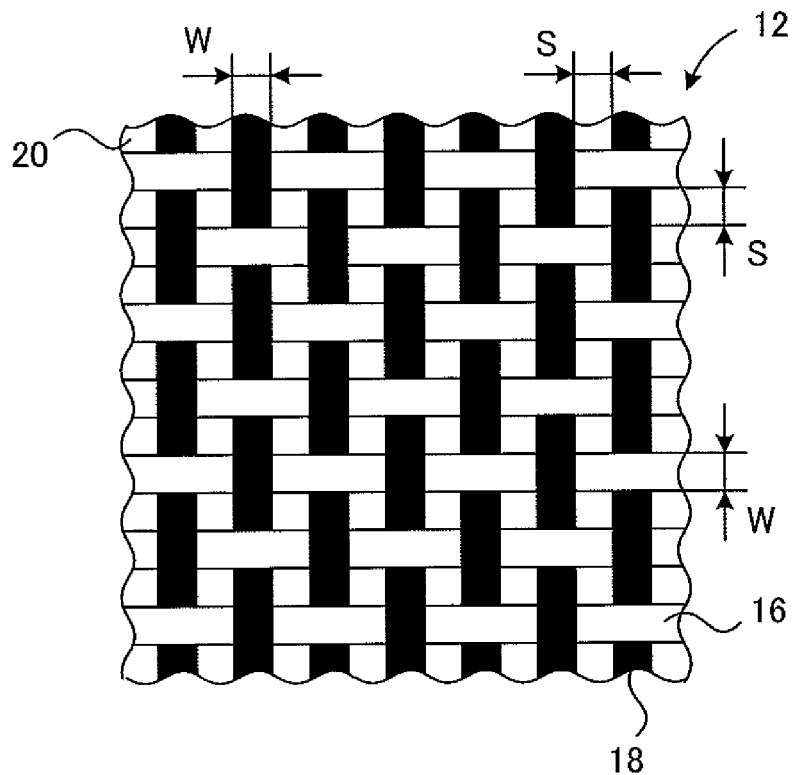
FIG. 3 is a partially enlarged plan view representing the board-like member of the first embodiment.

FIG. 1 and FIG. 2 are a plan view and a vertical sectional view each representing a surface shape variable device 10 according to a first embodiment of the present invention. The surface shape variable device 10 comprises a board-like member 12 which forms a plane board-like shape in a standard condition, and a frame member 14 which holds an outer circumferential part of the board-like member. As represented in FIG. 3, the board-like member 12 comprises a plurality of first strip elements 16 extending in parallel to each other along an X direction (first direction), and a plurality of second strip elements 18 extending in parallel to each other along a Y direction (second direction) which is vertical to the first direction. Size of the frame member 14 or number of the first strip elements 16 or the second strip elements 18 may be suitably set according to use of the surface shape variable device 10.

The first strip elements 16 and the second strip elements 18 have necessary elasticity and hardness, formed with a carbon fiber reinforced resin (CFRP: carbon fiber reinforced plastic) in which a plurality of carbon fibers (not illustrated) extend along the longitudinal direction of the strip elements. The carbon fiber reinforced resins which form the first and the second strip elements 16 and 18 may be identical to or different from each other. The strip elements 16 and 18 are elastically morphed due to buckling toward the direction vertical to the plane P of the board-like member 12, namely, toward a Z direction vertical to the X direction and the Y direction when a compression stress is applied to the longitudinal direction thereof. The strip elements restore the original shapes when released from the compression stress. Dimensions of the strip elements 16 and 18 may be appropriately set depending on use of the surface shape variable device 10. For example, width W may be 5 to several tens of mm, thickness T may be 0.01 to several mm, and length L may be several tens to several hundreds of mm.

As shown in FIG. 3, the first and the second strip elements 16 and 18 are woven into a state of plain weave fabric with being spaced from each other by a distance S, so as to cooperate to form a board-like shape. The distance S is preferably as large as, or smaller than the width W of the strip elements, but may be larger than the width W. The distance S between each of the first strip elements 16 may be different from the distance S between each of the second strip elements 18.

In this connection, weave of the first and the second strip elements 16 and 18 is not limited to plane weave, but may be another weave such as twill weave, as long as it allows the strip elements to be elastically morphed by the stress applied thereto. The board-like member 12 may comprise a part which is three dimensionally woven, at least partially. Crossing angle between the first and the second strip elements 16 and 18, namely, crossing angle between the X direction and Y direction is 90°, and may be an angle other than 90°.

The surfaces of the first and the second strip elements 16 and 18 are smooth to an extent that allows the elements the relative shifting when they are elastically morphed. The surfaces of the first and the second strip elements 16 and 18 also have a surface roughness of such a degree that would not allow the strip elements in an elastically morphed state the relative shifting, even if the compression stress applied thereto has some fluctuation. Besides, the properties and conditions of the surfaces of the strip elements 16 and 18 in the sides which are engaged with each other may be different from the properties and conditions of the surfaces of the sides opposite to the sides which are engaged with each other.

Deformable film member 20 is bonded to one of the sides (the upper side in FIG. 2) of the board-like member 12 by a means such as gluing, so as to inhibit gas, liquid, or powder and grains from passing through the board-like member 12, and to keep a surface smoothness of the board-like member. The film member 20 may be formed with any material having flexibility and elasticity, which is preferably a Latex sheet, a polyurethane film, a PEEK film, or the like.

In order for the first and the second strip elements 16 and 18 to comparatively easily shift relatively to each other and to the film member, it is not preferred that the film member is bonded to the entire surface of the each strip elements, but preferably is bonded at portions where the strip elements are spaced from each other. Furthermore, the film member may be bonded to both sides of the board-like member 12. In that case, it is possible to effectively reduce concern that extraneous material such as dust enters between the strip elements.

The frame member 14 forms a square shape, and may form another shape such as rectangle, trapezoid, parallelogram, circle, and oval. In the first embodiment, the frame member 14 comprises plane board member 14A and framing members 14B and 14C. The framing member 14B is fixed to the plane board member 14A, and the framing members 14B and 14C are detachably fixed to each other with sandwiching the outer circumferential part of the board-like member 12. The framing members 14B and 14C may be board members each positioned on one end side and the other end side of the strip elements.

The one sides of the first and the second strip elements 16 and 18 are fixed to the frame member 14, for example, by screws 22. Parts of the other ends of the first and the second strip elements 16 and 18 extend penetrating the frame member 14. The regions of the framing members 14B and 14C where the strip elements extend penetrating the frame member 14 function as a shift guiding member which supports the strip elements so as to allow the strip elements 16 and 18 to shift relatively to the frame member 14 along the plane P.

Within the framing member 14B, pedestal plane board 24 is arranged in the center, and the pedestal plane board 24 is fixed to the plane board member 14A. When the board-like member 12 is in a standard condition and forms a plane board-like shape, the pedestal plane board 24 is in contact with the board-like member 12. Accordingly, the pedestal plane board 24 functions as a morphing guide unit which guides the board-like member 12 not to be curvedly morphed toward the plane board member 14A, but to be curvedly morphed toward the Z direction which deviates from the plane board member 14A relatively to the plane P, when the first and the second strip elements 16 and 18 are elastically morphed due to buckling.

The other ends of the first strip elements 16 and the second strip elements 18 are each equipped with morphing control devices 26 and 28 respectively. The morphing control devices 26 and 28 apply compression stress to the corresponding strip elements, along the directions in which the corresponding strip elements extend, and control the compression stress to thereby elastically morph the strip elements vertically, or upwardly in FIG. 2, to the plane P. Thus, the morphing control devices 26 and 28 function as morphing control units which control the curved morphing of the board-like member 12. In the illustrated first embodiment, some of the morphing control devices 26 and 28 are configured to collectively apply the compression stress to plural number of first and second strip elements 16 and 18 respectively. However, the morphing control device may be provided individually to every first and the second strip element.

In this connection, strip elements which extend adjacently in parallel to the frame member 14 may not be provided with the morphing control devices 26 or 28 as shown in FIG. 1, since an elastic morphing of the strip elements which extend adjacently in parallel to the frame member 14 is restricted by the frame member. Furthermore, in a region adjacent to the frame member 14, the strip elements extending in parallel to the frame member may be omitted.

The morphing control devices 26 and 28 in the first embodiment comprise piston-cylinder type actuators 26A and 28A which function as driving unit and shift sensors 26B and 28B. The other ends of the first strip elements 16 and the second strip elements 18 are connected to heads of rod members of pistons of the actuators 26A and 28A respectively, and a cylinder of each of the actuators 26A and 28A is fixed to the plane board member 14A. The shift sensors 26B and 28B function as detecting unit which detect shifted amount of the other ends of the strip elements 16 and 18 respectively, by detecting relative shifted amounts of the rod members of the pistons to the cylinders of the actuators.

The actuators 26A and 28A may be piston-cylinder devices of either an air pressure type or a hydraulic type. Expansion and contraction of the actuators 26A and 28A and the amount thereof are controlled in such a manner that an electronic control device which is not shown in the Figures controls charge/discharge of compressed air or high pressure oil to a cylinder chamber of the piston-cylinder device. The electronic control device may be configured to memorize a relationship between an amount of shift of the other end of the each of the strip elements 16 and 18 and a curvedly morphed amount of the board-like member 12 which have been found in advance, and to control the amount of a curved morphing of the board-like member 12 on the basis of the shifted amount of the other ends.

Figure 4:
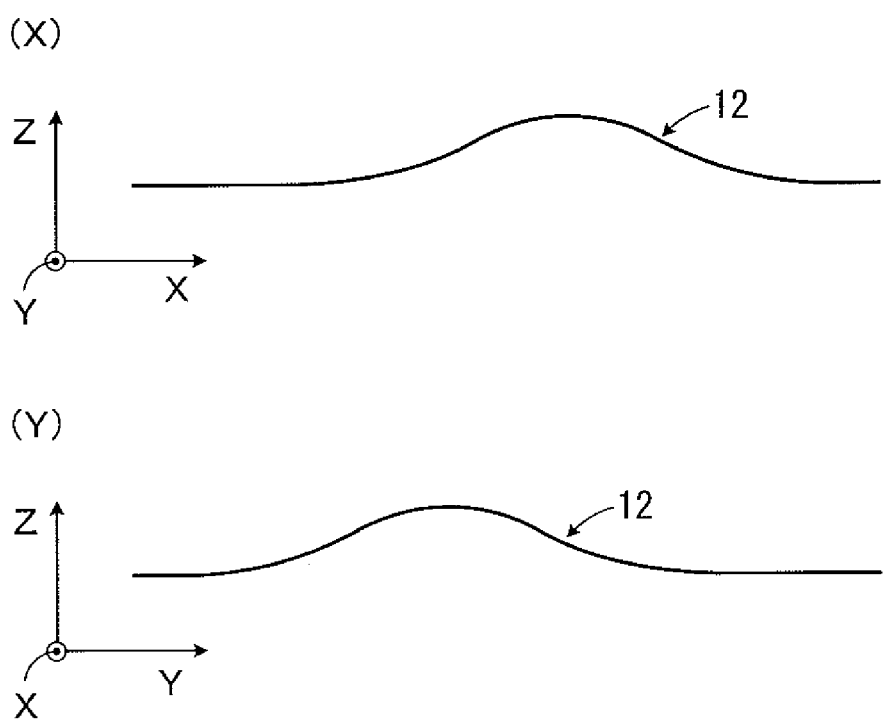
FIG. 4 is cross sectional views representing an example of a curvedly morphed shape of the board-like member of the first embodiment, in a vertical section (X) in an X direction, and in a vertical section (Y) in a Y direction.

It is possible to control the curvedly morphed shape of the board-like member 12 by controlling the compression stress applied to the strip elements 16 and 18 by the morphing control devices 26 and 28 respectively. It is also possible to keep the curvedly morphed shape of the board-like member 12 by maintaining the compression stress applied to the strip elements by the morphing control devices, and to allow the board-like member 12 to recover the plane board-like shape by the elasticity of each of the strip elements 16 and 18 by releasing the strip elements from the compression stress. For example, when the compression stress applied to the strip elements 16 and 18 is controlled to be the highest at the center of the X direction and the Y direction, and to become lower as the distance from the center increases, the board-like member 12 can be morphed into a mountain-like shape as shown in FIG. 4. Furthermore, it is possible to keep or to clear the mountain-like shape of the board-like member 12 by maintaining or cancelling the compression stress applied to the strip elements 16 and 18.

Furthermore, it is possible to predetermine the morphed shape of the board-like member 12 with a certain degree of freedom, by setting hardness or dimension of the strip elements, or elasticity or tension of the film member 20 so as to be partially different, or by partially restricting or controlling the elastic morphing of the strip elements. For example, by setting the hardness of the strip elements higher in the center part than in the other regions, it is possible to lower the peak of the elastically morphed mountain-like shape and increase the amount of morphing in the surroundings of the peak at the same time, to thereby make an elastically morphed shape to be a gradually sloped mountain-like shape.

Second embodiment

Figure 5:
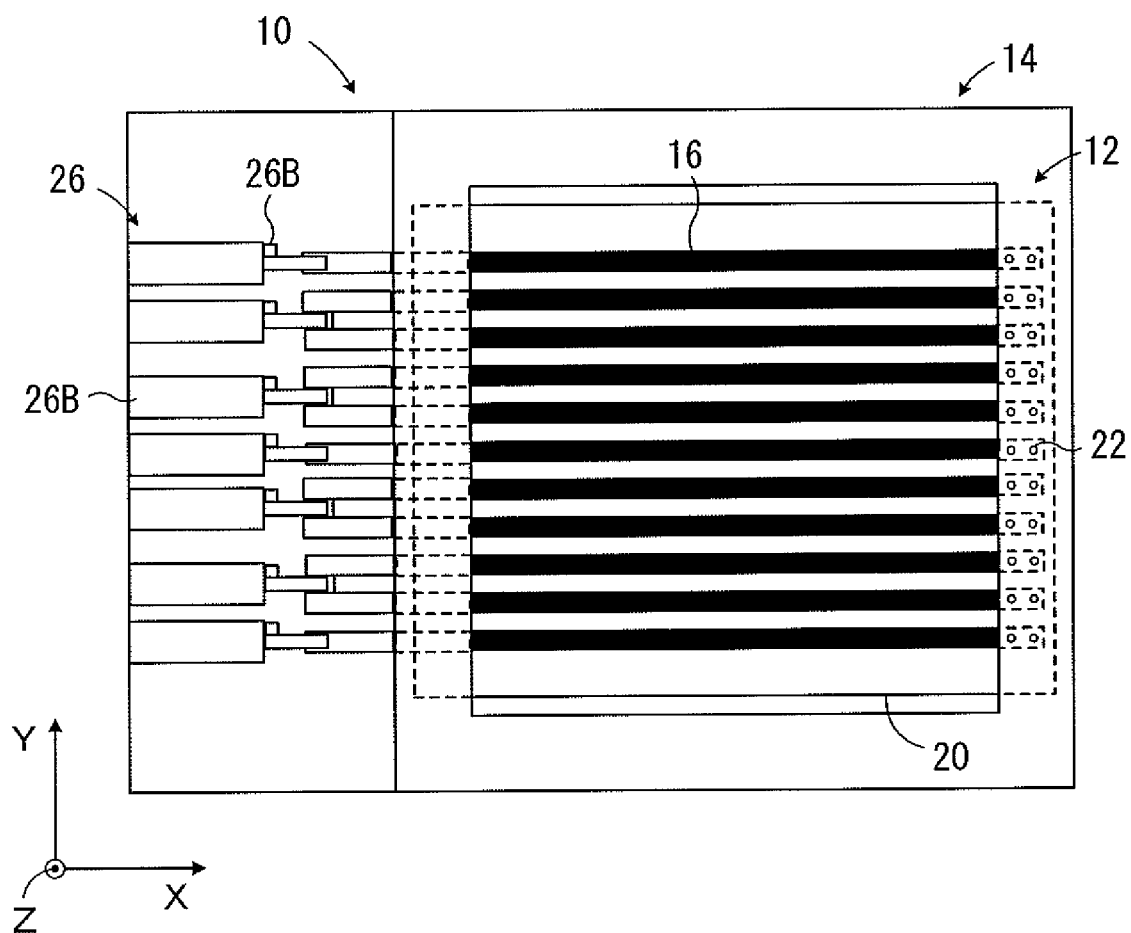
FIG. 5 is a plan view representing a second embodiment of a surface shape variable device according to the present invention comprising a board-like member in which the strip elements are arranged in parallel in only one direction.

FIG. 5 is a plan view representing a surface shape variable device 10 according to a second embodiment of the present invention. The surface shape variable device 10 according to this embodiment also comprises a board-like member 12 which forms a plane board-like shape in a standard condition, and a frame member 14 which holds an outer circumferential part of the board-like member. However, although the board-like member 12 comprises a plurality of first strip elements 16 which extends in parallel with one another along the X direction, it does not comprises the plurality of second strip elements 18 which extends in parallel with one another along the Y direction which is vertical to the X direction. A deformable film member 20 is bonded to one of the sides of the board-like member 12 by a means such as gluing, such that the plurality of first strip elements 16 are connected as one body, allowing each of the strip elements a certain degree of shifting relative to one another.

The board-like member 12 has a length in the X direction larger than the inside dimension of the frame member 14, and a length in the Y direction smaller than the inside dimension of the frame member 14. Therefore, as shown in FIG. 5, the both ends of the board-like member 12 in the X direction are supported by the frame member 14, while the both ends of the board-like member 12 in the Y direction are not supported by the frame member 14. However, also in this embodiment, the both ends of the board-like member 12 in the Y direction may be supported by the frame member 14.

This second embodiment is provided with a plurality of morphing control devices 26 which apply compression stress along the direction in which the strip elements extend and controls the compression stress to all the strip elements 16 including strip elements 16 in a region adjacent to the frame member 14. However, no device corresponding to the morphing control device 28 in the first embodiments is provided. Each of the morphing control devices 26 is configured to apply compression stress to each of the plurality of first strip elements 16 as in the first embodiment. However, in the second embodiment, all the first strip elements 16 are applied with a uniform compression stress.

Figure 6:
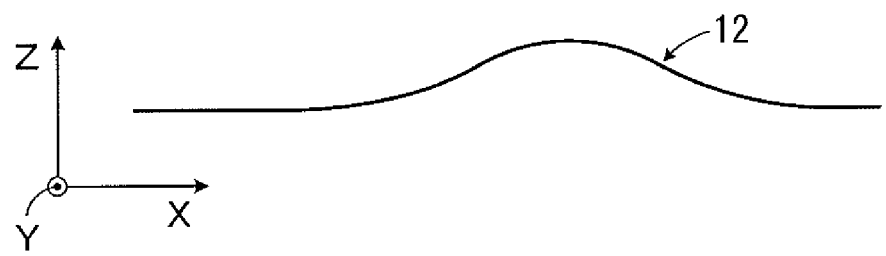
FIG. 6 is a cross sectional view representing an example of a curvedly morphed shape of the board-like member of the second embodiment, in a vertical section in the X direction.

Accordingly, in the second embodiment, the curvedly morphed shape of the board-like member 12 can be controlled by controlling the compression stress applied to the strip elements 16 by the morphing control device 26. For example, it is possible to morph the board-like member 12 as shown in FIG. 6, such that its cross sectional shape in the X direction has a mountain-like shape, and the cross sectional shape is identical at any position in the Y direction.

Also, in the second embodiment, the compression stress applied to the strip elements 16 by the morphing control device 26 may be controlled to be different as viewed from the Y direction. For example, the compression stress applied to strip elements 16 may be controlled to be the highest at the center in the X direction, and to become lower as the distance from the center increases. In this way, the board-like member 12 can be morphed such that the cross sectional shape along the X direction has a mountain-like shape, and the height of the mountain-like shape becomes lower as the distance from the center in the Y direction increases.

Third embodiment

Figure 7:
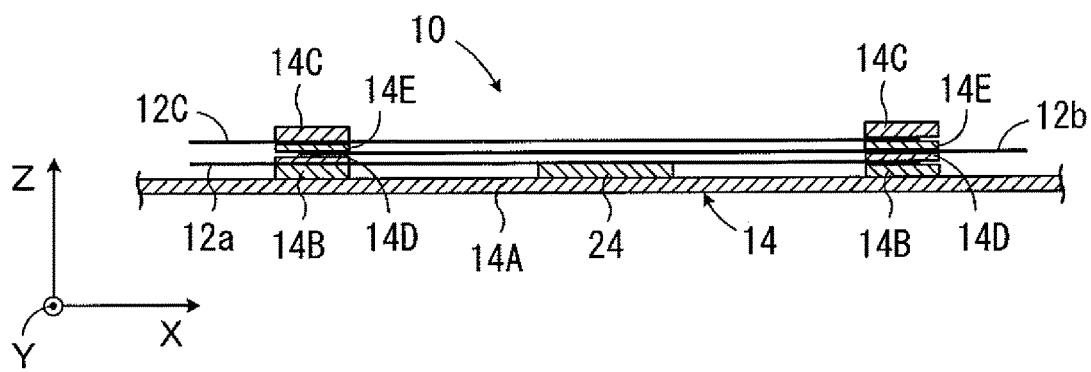
FIG. 7 is a vertical sectional view representing a third embodiment of a surface shape variable device according to the present invention, comprising a laminated body of three board-like members.

FIG. 7 is a vertical sectional view of a surface shape variable device 10 according to a third embodiment of the present invention, with illustration of the morphing control device omitted. The surface shape variable device 10 of this embodiment has a laminated body 12S formed by laminating three board-like members 12a to 12c, each of which being similar to the board-like member 12 of the first embodiment, in the Z direction. In the regions of a frame member 14, spacers 14D and 14E which are similar to the framing members 14B and 14C are provided between the board-like members 12a and 12b, and between the board-like members 12b and 12c.

Although not shown in the Figures, morphing control devices (26 and 28) for the board-like members 12a and 12c are provided to the board-like members at the same positions with those in the first embodiment. To the contrary, morphing control devices (26 and 28) for the board-like member 12b are provided to the board-like member at positions opposite to those in the first embodiment.

Figure 8:
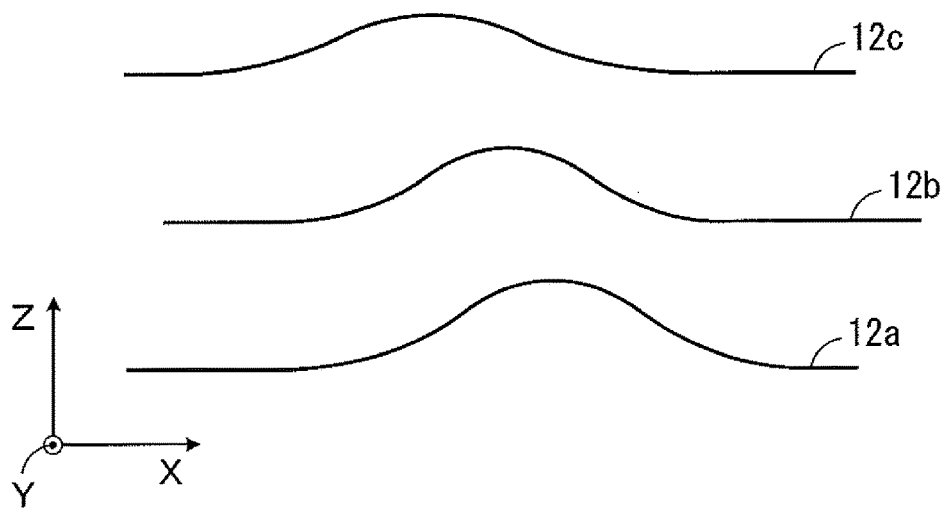
FIG. 8 (A) is a vertical sectional view separately representing elastically morphed shapes of three board-like members laminated with each other, and (B) is a vertical sectional view representing an elastically morphed shape of the laminated body of three board-like members.
Figure 8:
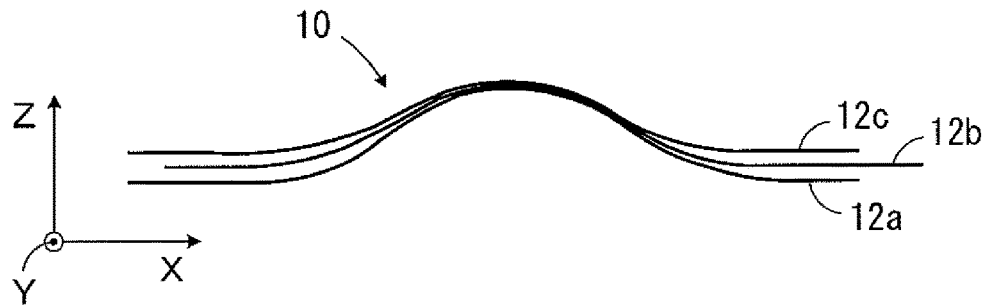

The board-like members 12a to 12c are configured to elastically morphed into shapes different from each other, for example, as shown in FIG. 8 (A), for example, by setting hardness or dimension of the strip elements, or elasticity or tension of a film member 20 so as to be different by part. The number of the board-like members which constitute the laminated body 12S is not limited to 3, but may be appropriately set depending on use of the surface shape variable device 10.

According to the third embodiment, an elastically morphed shape of the laminated body 12S is determined by elastically morphed shapes of the board-like members 12a to 12c. Therefore, it is possible to elastically morph the laminated body 12S into a shape which is difficult to be achieved with a simple board-like member. For example, when the board-like members 12a to 12c are elastically morphed as shown in FIG. 8 (A), the laminated body 12S can be elastically morphed into a shape as shown in FIG. 8 (B).

Figure 9:
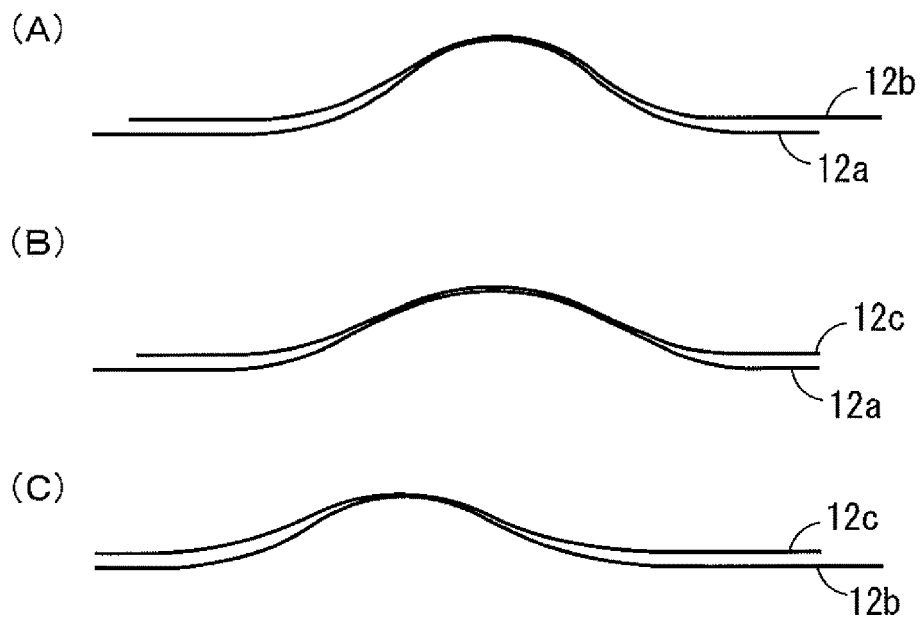
FIG. 9 is a vertical sectional view showing that an elastically morphed shape or an amount of the elastic morphing of the laminated body can be various shapes and amounts, by changing number or combination of the board-like members to be elastically morphed among the board-like members which constitute the laminated body, in the third embodiment.

Also, according to the third embodiment, it is possible to change the elastically morphed shape or elastically morphed amount of the laminated body to various shapes and amounts by changing number or combination of the board-like members to be elastically morphed by a morphing control device which is not shown in the Figures among the board-like members which constitute the laminated body 12S. For example, when the board-like members 12a and 12b are elastically morphed, the laminated body 12S is morphed into a shape as shown in FIG. 9 (A). When the board-like members 12a and 12c are elastically morphed, the laminated body 12S is morphed into a shape as shown in FIG. 9 (B). Furthermore, when the board-like members 12b and 12c are elastically morphed, the laminated body 12S is morphed into a shape as shown in FIG. 9 (C).

Forth Embodiment

Figure 10:
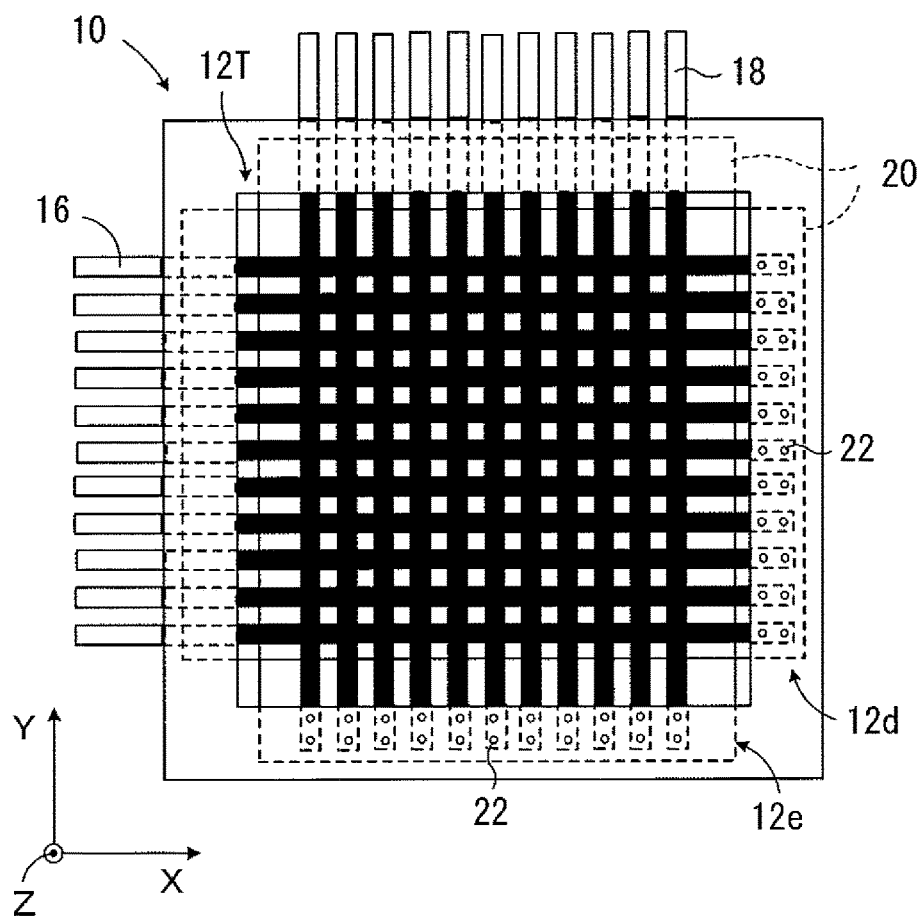
FIG. 10 is a plan view representing a forth embodiment of a surface shape variable device according to the present invention, with illustration of a morphing control device omitted.

FIG. 10 is a plan view representing a surface shape variable device 10 according to a forth embodiment of the present invention which is structured as a modification example of the second embodiment, with illustration of morphing control devices omitted. The surface shape variable device 10 of this embodiment comprises laminated body 12T which is formed by laminating board-like member 12d and board-like member 12e each other, the board-like member 12d comprising only the first strip elements 16 constructed similarly to the board-like member 12 of the second embodiment, and the board-like member 12e comprising only the second strip elements 18.

Although not shown in FIG. 10, spacers which are similar to the framing members 14B and 14C are provided between the board-like members 12d and 12e in the regions of a frame member 14. In this embodiment, morphing control devices for the board-like member 12d are configured to apply compression stresses different from one another to the plurality of first strip elements 16, and morphing control devices for the board-like member 12e are configured to apply compression stresses different from one another to the plurality of second strip elements 18.

According to the forth embodiment, the compression stresses different from one another are applied to the plurality of first strip elements 16, and the compression stresses different from one another are applied to the plurality of second strip elements 18. Accordingly, the board-like members 12d and 12e are elastically morphed so as to have sectional shapes different by positions along the Y direction and X direction respectively. As a result, the laminated body 12T can be morphed as in the first embodiment, not to have a uniform cross sectional shape as in the second embodiment.

Elastically morphed shape and elastically morphed amount of the laminated body 12T are determined according to elastically morphed shapes and elastically morphed amounts of the board-like members 12d and 12e. Therefore, it is possible to control elastically morphed shape and elastically morphed amount of the laminated body 12T by controlling elastic morphing of the board-like members 12d and 12e.

Furthermore, according to this forth embodiment, since it is not necessary to weave the plurality of strip elements into the state of woven fabric, it is possible to simplify the structures of the board-like members 12d and 12e compared to the board-like member 12 of the first embodiment, and to reduce the production cost.

Fifth embodiment

Figure 11:
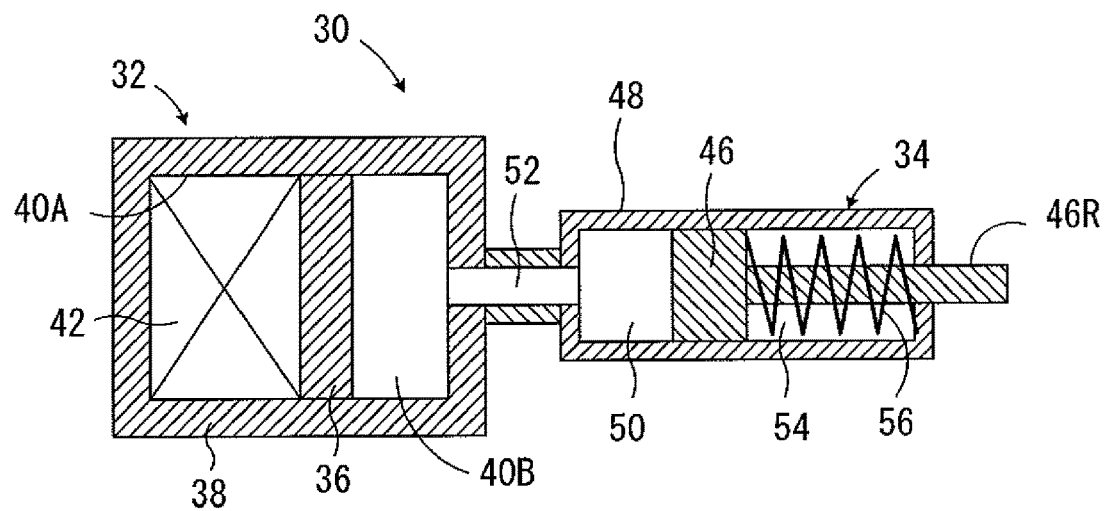
FIG. 11 is a diagram representing a morphing control device in a fifth embodiment of a surface shape variable device according to the present invention.

FIG. 11 is a diagram representing morphing control device 30 of a surface shape variable device 10 according to a fifth embodiment of the present invention. The morphing control device 30 is a morphing control device capable of being used instead of the morphing control devices (26 and 28) of the first to the forth embodiments. Therefore, the structure of the surface shape variable device 10 other than the morphing control device 30 may be any one of the structures of the surface shape variable devices 10 of the first to the forth embodiments, and may be different from the surface shape variable devices of these embodiments.

In this embodiment, the morphing control device 30 comprises shift generating device 32 and shift enlarging device 34. The shift generating device 32 is a hydraulic piston-cylinder device, which comprises free piston 36 and cylinder 38 which are engaged in a reciprocating manner relatively to each other. In cylinder chamber 40A which is one of cylinder chambers formed by the free piston 36 and the cylinder 38, a laminated body of piezoelectric elements 42 is disposed, and the other cylinder chamber 40B is filled with oil 44. When a control voltage is impressed, the laminated body of piezoelectric elements 42 increase its volume in the longitudinal direction of the cylinder 38 to thereby drive the free piston 36 relative to the cylinder 38 so that the volume of the other cylinder chamber 40B is decreased.

The shift enlarging device 34 also is a hydraulic piston-cylinder device which comprises piston 46 and cylinder 48 which are engaged in a reciprocating manner relatively to each other. However, area of the cross section thereof is set to be smaller than area of the cross section of the shift generating device 32. Cylinder chamber 50 which is one of cylinder chambers formed by the piston 46 and the cylinder 48 is connected to the cylinder chamber 40B of the shift generating device 32 by communicating passage 52. Rod member 46R of the piston 46 extends penetrating the cylinder 48. Although not shown in the Figures, the head of the rod member 46R is configured to be connected to the other end of the strip elements through a connection member. In the other cylinder chamber 54 formed with the piston 46 and the cylinder 48, a compression coil spring 56 for recovery is elastically provided in a state of being wound around the rod member 46R.

According to this embodiment, the piston 46 of the shift enlarging device 34 is driven by controlling the control voltage impressed to the laminated body of piezoelectric elements 42, to thereby apply a compression stress to the strip elements and control the compression stress.

Provided that Rinc represents a ratio of the cross section of the shift enlarging device 34 to the cross section of the shift generating device 32, an amount of shift of the piston 46 is a product of an amount of shift of the free piston 36 and Rinc. Therefore, according to this embodiment, it is possible to enlarge range of morphing of the board-like member, for example, by enlarging variable range of the compression stress applied to the strip elements, compared to a case in which the piston 46 of the shift enlarging device 34 is driven by the laminated body of piezoelectric elements. Furthermore, it is possible to reduce the number of lamination of the piezoelectric element which is required to apply a necessary compression stress to the strip elements.

Also, according to this embodiment, it is not necessary to charge or discharge the compressed air or high pressure oil to the piston-cylinder devise as in the morphing control devices (26, 28) in the first to the forth embodiments described above. Accordingly, there is no need of the supplying source of the compressed air or of the high pressure oil, or the valve which controls the charge and discharge, and as a result, it is possible to simplify the structure which is necessary for an operation of the morphing control device.

In the fourth embodiment described above, the free piston 36 of the shift generating device 32 is configured to be driven by the laminated body of the piezoelectric elements 42. However, a modification may be made such that the free piston 36 is driven by a shape-memory alloy or a shape-memory resin which varies its shape with temperature change, and the driving of the free piston 36 is controlled by controlling temperature of the shape-memory alloy or the shape-memory resin.

Sixth embodiment

Figure 12:
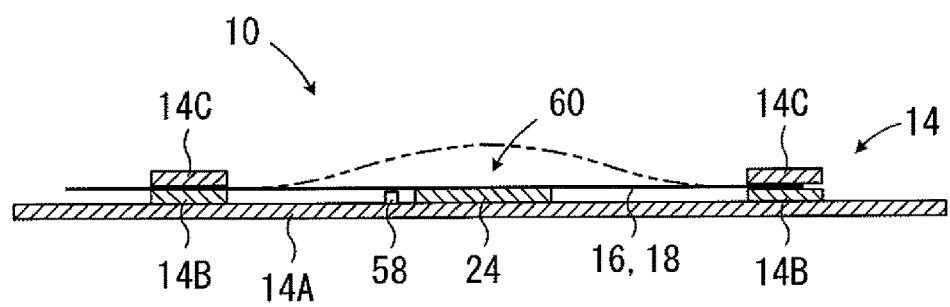
FIG. 12 is a vertical sectional view representing a sixth embodiment of a surface shape variable device according to the present invention.

FIG. 12 is a vertical sectional view representing a surface shape variable device 10 according to a sixth embodiment of the present invention. In the surface shape variable device 10 of this embodiment, strip elements 16 and 18 are formed with a shape-memory alloy or a shape-memory resin, and are in a flat form at normal time. Accordingly, a board-like member 12 forms a plane board-like shape at normal time. The strip elements 16 and 18 are fixed to a frame member 14 at one of the ends, and are supported by the frame member 14 in a manner relatively shiftable in the longitudinal direction thereof at the other end.

Although not shown in FIG. 12, a plane board member 14A and a pedestal plane board 24 of this embodiment comprise a heater built therein which heats the strip elements 16 and 18 and control the temperature thereof. When the strip elements 16 and 18 are heated to a predetermined or higher temperature, the shapes thereof are changed into a memorized shapes, and in this way, the board-like member 12 is morphed into the curved shape as shown by a hypothetical line in FIG. 12.

In this connection, the plane board member 14A or the pedestal plane board 24 may be provided with temperature sensor 58 which detects the temperature of a board-like member 12. According to a result of detection by the temperature sensor 58, the heater is controlled by an electronic control device which is not shown in FIG. 12 to thereby control the temperature of the board-like member 12, and thus, the shape of the board-like member. Thus, the pedestal plane board 24 and the temperature sensor 58 which comprise a heater built therein constitute a temperature controlling device 60 which controls the temperatures of the strip elements 16 and 18, in cooperation with the electronic control device. The temperature controlling device may have another structure.

According to this embodiment, it is possible to predetermine the shape after the morphing of the board-like member 12, according to a setting of the memorized shapes of the strip elements 16 and 18. Therefore, it is possible to morph the board-like member 12 into various shapes according to a setting of the memorized shapes of the strip elements 16 and 18, to provide a higher degree of freedom in the morphed shape of the board-like member 12, compared to those in the other embodiments.

According to this embodiment, it is possible to morph the shape of the board-like member 12 between a plane board-like shape and a curved shape by controlling the temperature of the strip elements 16 and 18. Therefore, it is possible to omit the driving device which shift the other ends of the strip elements relatively to the one ends, and thus, to simplify the structure of the surface shape variable device compared to in the other embodiments In the sixth embodiment described above, the strip elements 16 and 18 as a whole is formed with a shape-memory alloy or a shape-memory resin, and the surface of the strip elements formed with the shape-memory alloy or the shape-memory resin may be coated with a heat resistant resin or the like. The strip elements may have a layer formed with a shape-memory alloy or a shape-memory resin and a layer of a heat resistant resin or the like bonded to each other so as to be integrated into a laminated structure.

In the second or the forth embodiment described above, at least some of the strip elements (16 and 18) may be formed with a shape-memory alloy or a shape-memory resin as in this sixth embodiment or as in the modified example described above.

Seventh embodiment

Figure 13:
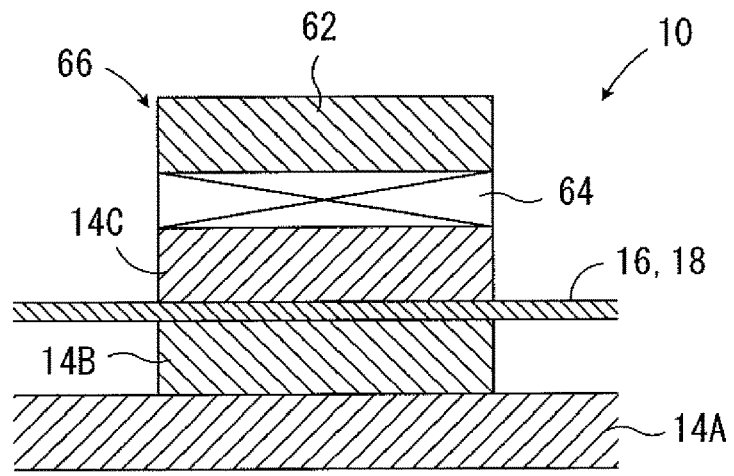
FIG. 13 is a partially enlarged vertical sectional view representing a main part of a surface shape variable device according to a seventh embodiment of the present invention.

FIG. 13 is a partially enlarged vertical sectional view representing a main part of a surface shape variable device 10 according to a seventh embodiment of the present invention. In the surface shape variable device 10 of this embodiment, pressure plate 62 is arranged on the top of the four corners of the framing member 14 C of the frame member 14, and the pressure plate 62 is integrally connected with the plane board member 14A. A laminated body of piezoelectric elements 64 is provided between the pressure plate 62 and the framing member 14C. At a normal time with no control voltage impressed, the laminated body of piezoelectric elements 64 does not press the framing member 14C toward the framing member 14B, and accordingly allow those framing members to guide the shifting of strip elements 16 and 18. To the contrary, when a control voltage is impressed, the laminated body of the piezoelectric elements 64 presses the framing member 14C toward the framing member 14B, to thereby inhibit the strip elements 16 and 18 from shifting relatively to the framing members 14B and 14C.

Thus, the pressure plate 62 and the laminated body of piezoelectric elements 64, in cooperation with the flame member 14, form shape retaining device 66 which retains a shape of the board-like member 12 by inhibiting the other ends of the strip elements 16 and 18 from shifting relatively to the one ends when the shape of the board-like member 12 is to be retained. The shape retaining device 66 may have any structure, as long as it is capable of retaining a shape of the board-like member 12 when necessary by inhibiting the other ends of the strip elements 16 and 18 from shifting relatively to the one ends.

According to this embodiment, it is possible to inhibit the other ends of the strip elements 16 and 18 from shifting relatively to the one ends by operating the shape retaining device 66. Thus, it is possible to effectively prevent the shape of the board-like member from being morphed, at a time of retention of the shape of the board-like member, compared to a case in which a shape of the board-like member 12 is retained only by maintaining a stress applied to one of the ends of the strip elements 16 and 18 by the morphing control devices 26 and 28.

As understood from the above explanations, according to each embodiment described above, the strip elements (16 and 18) are applied with the stress along the direction in which the elements extend by the morphing control devices (26 and 28), and accordingly, the strip elements are elastically morphed due to buckling toward the direction traversing the surface. Therefore, since the morphing control unit needs only to be arranged on the extension line of the strip elements, the surface shape variable device has a less spatial restriction compared to conventional ones. As a result, it is possible to expand the range of use to which a surface shape variable device can be applied.

When the strip elements are released from the stress which has been applied thereto, the strip elements recover the original shape. Therefore, in a case where the board-like member is formed, for example, by bonding a film member (20) to the strip elements, it not necessary that the film member itself has a high elasticity. Therefore, it is possible to reduce the degree that shapes before and after a morphing are determined depending on the elasticity of a film member.

In addition, since the strip member to be morphed is not morphed by being pressed with a pressing member of a mechanical device which comes into contact, it is possible to avoid that morphed shapes of the strip member are restricted to a shape of the pressing member of the mechanical device.

The board-like member 12 has the deformable film member 20 which is bonded to at least one of the surfaces thereof. Therefore, it is possible to improve the smoothness of a surface of the part where the shape is morphed of the surface shape variable device 10, compared to a case in which the board-like member 12 does not have the film member 20 bonded thereto. It is also possible by the film member to inhibit gas, liquid, or powder and granules from traversing and passing the board-like member, or from entering between the strip elements.

According to the embodiments described above other than the second and the forth embodiments, the board-like member 12 comprises the first and the second strip elements 16 and 18 each extending to a direction traversing the other, and these strip elements are woven into a woven fabric-like state. Therefore, compared to the second embodiment having only either the first or the second strip elements, it is possible to diversify the morphed shapes of the board-like member, and to enhance the intensity of the board-like member.

In the above, although the present invention has been explained in detail on the basis of the specific embodiments, the present invention is not limited to the above embodiments, and it shall be obvious for those skilled in the art that various other embodiments can be made within the scope of the present invention.

Figure 14:
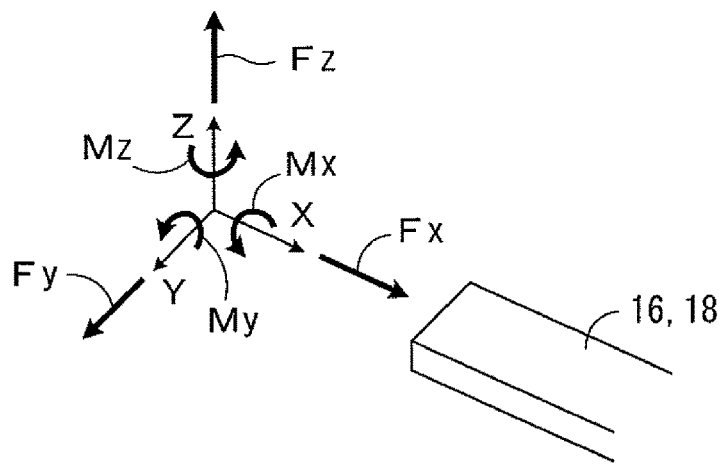
FIG. 14 is a perspective view representing various stresses Fx to Fz and rotary stresses Mx to Mz which may be applied to the other end of the strip elements.

In the embodiment described above, the other ends of the strip elements (16 and 18) are applied only with the stress along the X direction which is the direction in which the strip elements extend. However, as shown in FIG. 14, the stress applied to the other ends of the strip elements may be any one of stress Fx in the X direction, stress Fy in the Y direction, stress Fz in the Z direction, rotary stress (moment) around the X direction Mx, rotary stress around the Y direction My, rotary stress around the Z direction Mz, and a combination of any two or three thereof.

In a case where the combination of the stresses is applied to the other end of the strip elements, it is also possible to presume and control the morphed shape of the board-like member 12 on the basis of kind of the stresses to be combined, and directions or strengths thereof. In such cases, the combination of the stresses is preferably a combination of a compression stress Fx in the X direction and other two or three stresses, so that the buckling deformation is generated in the strip elements.

Figure 15:
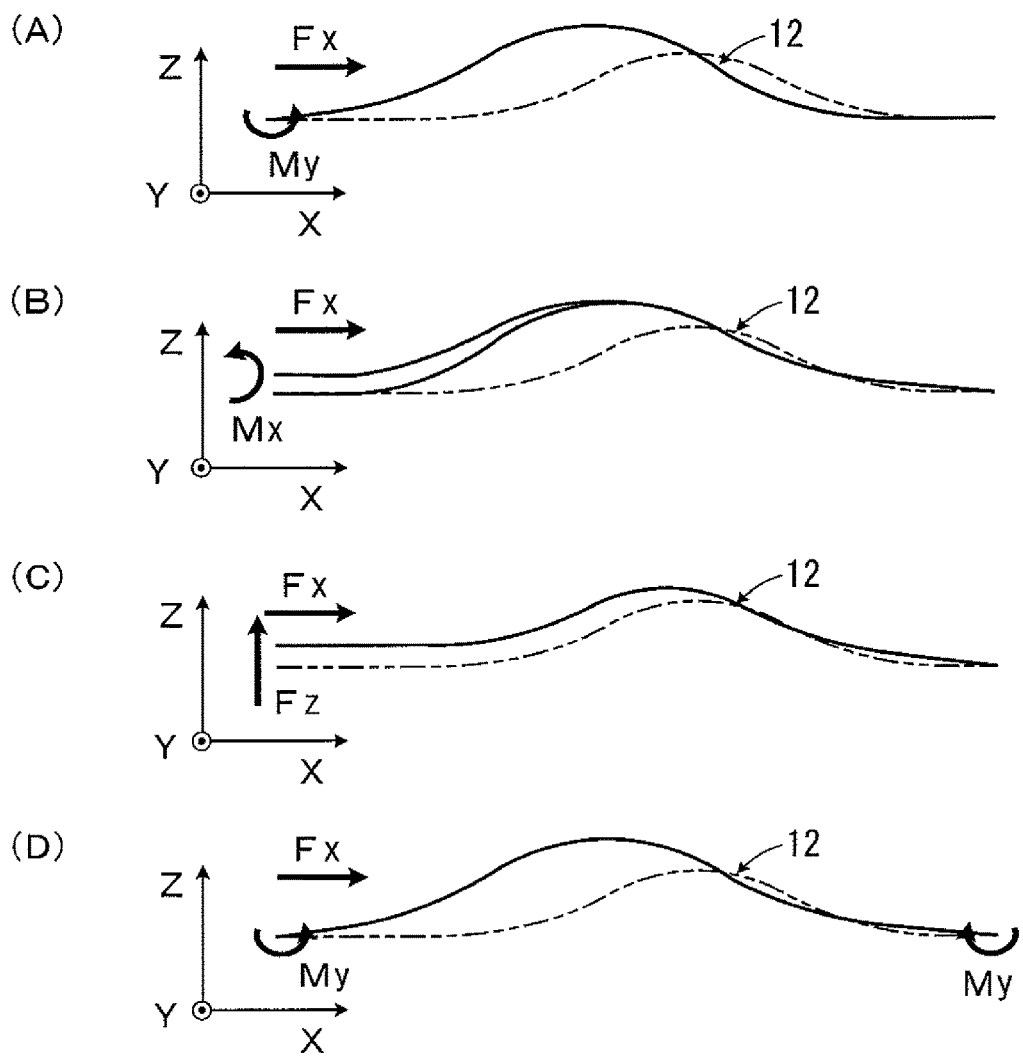
FIG. 15 is a vertical sectional view representing examples of the morphed shape of the board-like member when combinations of stresses are applied to the other end of the strip elements.

For example, when the other end of the strip elements is applied with a compression stress Fx in the X direction and a rotary stress My around the Y direction, the board-like member 12 is curvedly morphed as shown in FIG. 15 (A). When the other end of the strip elements is applied with a compression stress Fx in the X direction and a rotary stress Mx around the X direction, the board-like member 12 is curvedly morphed, and at the same time, the thickness thereof is changed, as shown in FIG. 15 (B). Furthermore, when the other end of the strip elements is applied with a compression stress Fx in the X direction and a stress Fz in the Z direction, the board-like member 12 is curvedly morphed as shown in FIG. 15 (C).

Figure 16:
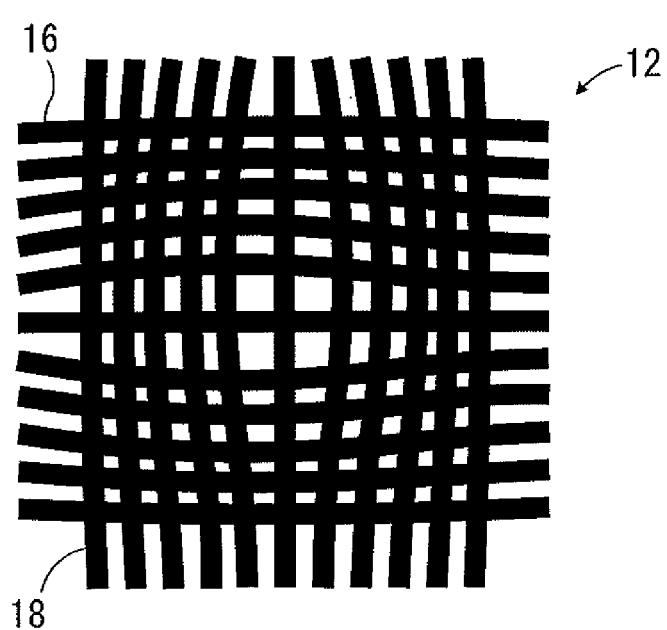
FIG. 16 (A) is a plan view representing a situation in which a compression stress Fx in the X direction is applied, while rotary stress My around a Y direction which reduces the density of the strip elements in the center part is applied to the other end of the strip elements; and (B) is a vertical sectional view representing that curvedly morphed shape of the board-like member.
Figure 16:
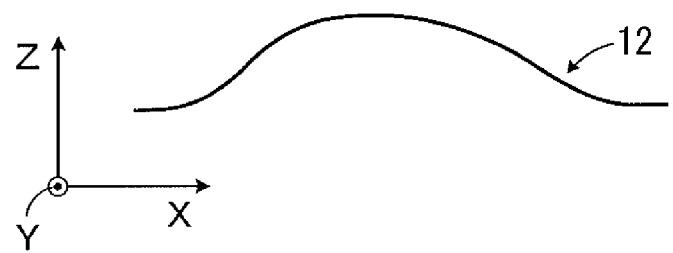

When the other ends of the strip elements 16 and 18 are applied with a compression stress Fx in the X direction, and a rotary stress My around the Y direction which reduce the density of the strip elements in the center part as shown in FIG. 16 (A), the board-like member 12 is curvedly morphed with the center part thereof being curvedly morphed in a lower degree as shown in FIG. 16 (B).

In the each embodiment above, the one ends of the strip elements (16 and 18) are fixed. However, in a condition that the one ends of the strip elements are bound so as not to be shifted toward the X direction, the one ends of the strip elements may be applied with any one of a rotary stress Mx around the X direction, a rotary stress My around the Y direction, and a rotary stress Mz around the Z direction. For example, when the other ends of the strip elements are applied with a compression stress Fx in the X direction and a rotary stress My around the Y direction, while the one ends of the strip elements are applied with an oppositely directed rotary stress My around the Y direction, the board-like member 12 is curvedly morphed as shown in FIG. 15 (D).

In the each embodiment above, the dimensions of the first and the second strip elements 16 and 18 are uniform over the entire length thereof. However, values of the thickness or the width in a region may be different from those in the other regions. For example, in a region where the first and the second strip elements 16 and 18 intersect with each other, the thickness thereof may be smaller than in the other regions.

Figure 17:
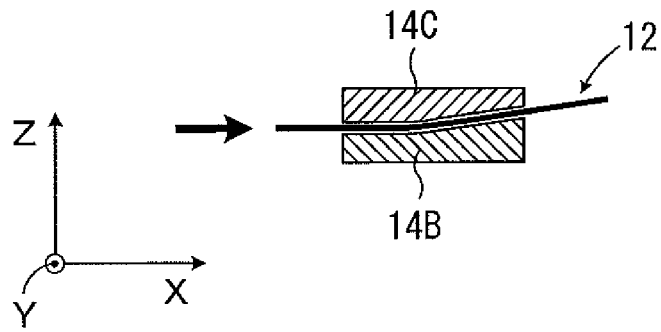
FIG. 17 is a partially enlarged vertical sectional view representing an example of a modification in which a direction of the strip elements guided by a shift guiding member of a frame member is sloped toward a predetermined direction.
Figure 18:
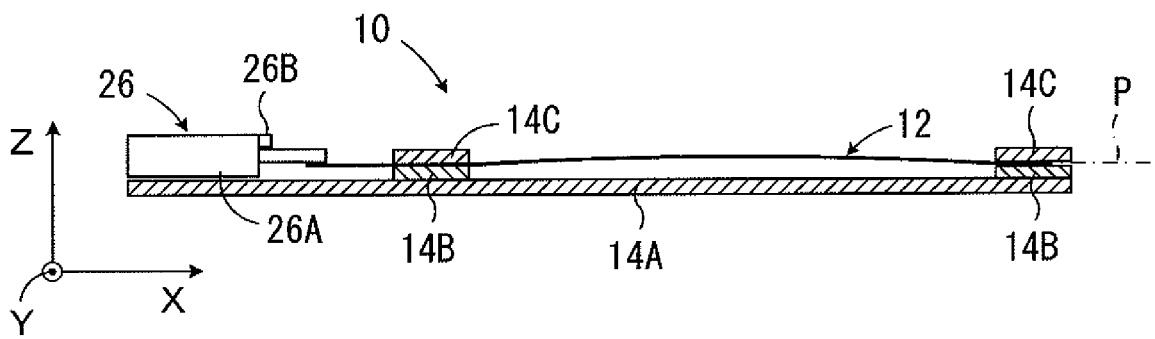
FIG. 18 is a vertical sectional view representing another example of a modification in which the board-like member as a whole is slightly curved toward a predetermined direction in a standard condition.
Figure 19:
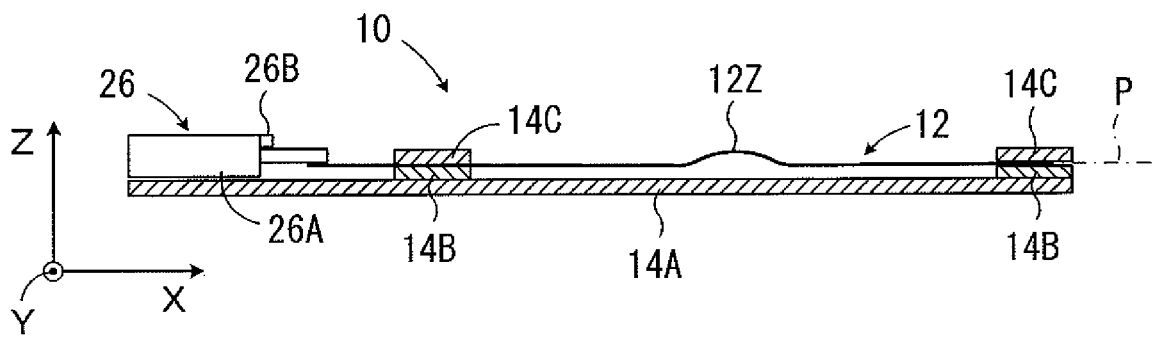
FIG. 19 is a vertical sectional view representing still another example of a modification in which the board-like member has a preliminarily morphed part which is locally curved toward a predetermined direction.

In the each embodiment described above, the flame member 14 comprises the plane board member 14A. However, the plane board member 14A may be omitted. In that case, the direction of guiding the strip elements by the shift guiding member of the flame member 14 may be sloped toward a predetermined direction as shown in FIG. 17, so that the board-like member 12 is elastically morphed toward a predetermined Z direction by being applied with a compression stress in the X direction to the strip elements. As shown in FIG. 18, the board-like member 12 may be slightly curved toward a predetermined Z direction as a whole in a standard condition. As shown in FIG. 19, the board-like member 12 may have a preliminarily morphed part 12Z which is locally curved toward a predetermined Z direction.

Any of the structure shown in FIG. 17 to FIG. 19 functions as a morphing guide unit which guide the strip elements to be elastically morphed toward the predetermined Z direction, when a compression stress in the X direction is applied to the strip elements. Therefore, the pedestal plane board 24 in the each embodiments described above is not necessary. The function of the morphing guide unit may also be achieved by driving at least a part of the board-like member 12 or the strip elements toward a predetermined Z direction by a spring, an elastic string, or a strip member.

In the each embodiment above, the board-like member 12 is in a plane board-like shape in the standard condition, and is curvedly morphed toward a predetermined Z direction when a compression stress in the X direction is applied to the strip elements. However, the board-like member 12 may be configured to be in a curved shape in the standard condition, and to be morphed into a plane board-like shape or to change the degree of being curved, when a compression stress or a tensile stress is applied to the strip elements.

In the first to the fifth embodiment described above, the detecting unit is configured to detect the shifted amount of the other end of the strip elements. However, the detecting unit may be a load sensor or the like which detects the compression stress applied to the strip elements by the morphing control device.

In the each embodiment described above, the strip elements are not vibrated when a compression stress is applied to the strip elements by the morphing control device to morph the board-like member 12. However, especially in a case where a coefficient of friction on the surface of the strip elements is set comparatively high in order to favorably maintain the morphed condition of the board-like member 12, a modification may be made to vibrate the board-like member 12, so that the relative shifting between the strip elements is easily made at the time of initiating the morphing and at the time of terminating the morphing of the board-like member 12.

Materials which form the strip elements such as resin have a lower hardness in a higher temperature. Accordingly, the higher the temperature, the lower the stiffness or the elasticity of the strip elements becomes to reduce the coefficient of friction at the time that the strip elements come into contact and shift relatively to each other. Therefore, although not shown in the Figures, a modification may be made such that the temperature of the strip elements is controlled, for example, by a temperature controlling device which is similar to the temperature controlling device 60 of the sixth embodiment to thereby vary the stiffness, the elasticity, or the coefficient of friction of the strip elements, and accordingly to control a morphing readiness, a shape retentivity, or a property of reducing vibration resulted by the friction between the strip elements, of the board-like member 12.

In the each embodiment described above, all the strip elements are applied with the stress at the other ends by the morphing control devices (26 and 28). However, it is also possible that there are some strip elements which are not applied with the stress to the other end, and those strip elements are passively morphed according to the morphing of the strip elements which are applied with the stress to the other end.

In the first embodiment described above, all the one ends of the first strip elements 16 are set in the same side of the flame member 14, and the morphing control devices 26 are installed in the opposite side of the flame member 14. Similarly, all the one ends of the second strip elements 18 are set in the same side of the flame member 14, and the morphing control devices 28 are installed in the opposite side of the flame member 14. However, for example, it is also possible that each of the first strip elements adjacent to each other is alternatively disposed in opposite direction, and each of the second strip elements adjacent to each other is alternatively disposed in opposite direction, and accordingly, the morphing control devices 26 and 28 are each arranged in both sides of the flame member 14.

In the fifth embodiment described above, an amount of shift of the free piston 36 of the shift generating device 32 is enlarged by the shift enlarging device 34. However, a shift of the shift generating device may be enlarged by another shift enlarging mechanism such as a four-jointed link type toggle mechanism.

REFERENCE SIGNS LIST

10: Surface shape variable device, 12: Board-like member, 14: Flame member, 16: First strip elements, 18: Second strip elements, 20: Film member, 26, 28: Morphing control device, 30: Morphing control device, 32: Shift generating device, 34: Shift enlarging device, 42: Laminated body of piezoelectric elements, 58: Temperature sensor, 60: Temperature controlling device, 66: Shape retaining device

The invention claimed is:
1. A surface shape variable device comprises:
a member comprising a plurality of strip elements capable of being elastically morphed which extend along a surface in parallel, one of ends of at least a part of the plurality of strip elements being bound,
a plurality of actuators applying a stress to at least a part of the plurality of strip elements to elastically morph the plurality of strip elements, wherein each actuator:
 comprises a piezoelectric body which drives the other end of the plurality of strip elements, and a detecting unit which detects a stress applied to the plurality of strip elements by the piezoelectric body,
 is connected to at least one of the plurality of strip elements, and
 comprises a piston coupled to the piezoelectric body and having a rod member and a coil spring wound around the rod member, the rod member applying the stress along a direction in which the plurality of strip elements extend and around the direction in which the strip elements extend, and
a morphing guide unit guiding the plurality of strip elements in a direction inclined toward a predetermined direction which traverses said surface so as to be elastically morphed toward the predetermined direction when the other end of the plurality of strip elements is shifted so as to come close to the one end by the actuators, wherein:
 each actuator comprises a shift sensor, and the shift sensor detects a shifted amount of the other end of the at least a part of the plurality of strip elements relative to the one end of the at least a part of the plurality of strip elements, and the plurality of strip elements are formed of a carbon fiber reinforced resin.

2. The surface shape variable device according to claim 1, wherein said stress is any of a stress along a direction in which the plurality of strip elements extend, a stress along a direction vertical to the direction in which the plurality of strip elements extend, a rotary stress around the direction in which the plurality of strip elements extend, a rotary stress around a direction vertical to the direction in which the plurality of strip elements extend, and a combination of two or three thereof.

3. The surface shape variable device according to claim 1, wherein the plurality of strip elements comprise a plurality of first strip elements extending in parallel along a first direction, and a plurality of second strip elements extending in parallel along a second direction which traverses said first direction, with said first and second strip elements being woven into a woven fabric-like state.

4. The surface shape variable device according to claim 1, wherein the piezoelectric body drives the other ends of two or more of the plurality of strip elements collectively.

5. The surface shape variable device according to claim 1, wherein said surface shape variable device further comprises a shape retaining unit which retains a shape of said member by inhibiting the other end of the plurality of strip elements from shifting relatively to the one end.

6. The surface shape variable device according to claim 1, wherein said at least a part of the plurality of strip elements comprises a part consisting of at least one of a shape-memory alloy and a shape-memory resin which is elastically morphed at least toward a direction traversing said surface in response to a temperature, and the actuators control temperature of the plurality of strip elements.

7. The surface shape variable device according to claim 1, wherein a deformable film member is bonded to at least one of the surfaces of said member.

8. The surface shape variable device according to claim 1, which a plurality of the strip elements are laminated with each other, and each actuator corresponds to each of the plurality of strip elements.

9. A surface shape variable device comprises:
a member comprising a plurality of strip elements capable of being elastically morphed which extend along a surface in parallel, one of ends of at least a part of the plurality of strip elements being bound,
a plurality of actuators applying a stress to at least a part of the plurality of strip elements to elastically morph the plurality of strip elements, wherein each actuator:
comprises a piezoelectric body which drives the other end of the plurality of strip elements, and a detecting unit which detects a stress applied to the plurality of strip elements by the piezoelectric body,
is connected to at least one of the plurality of strip elements, and
comprises a piston coupled to the piezoelectric body and having a rod member and a coil spring wound around the rod member, the rod member applying the stress along a direction in which the plurality of strip elements extend and around the direction in which the strip elements extend, and a morphing guide unit guiding the plurality of strip elements in a direction inclined toward a predetermined direction which traverses said surface so as to be elastically morphed toward the predetermined direction when the other end of the plurality of strip elements is shifted so as to come close to the one end by the actuators, wherein:
each actuator comprises a shift sensor, and the shift sensor detects a shifted amount of the other end of the at least a part of the plurality of strip elements relative to the one end of the at least a part of the plurality of strip elements, and
the morphing guide unit is in contact with a surface of the member.

10. A surface shape variable device comprises:
a member comprising a plurality of strip elements capable of being elastically morphed which extend along a surface in parallel, one of ends of at least a part of the plurality of strip elements being bound,
a frame member holding an outer circumferential part of the member,
a plurality of actuators applying a stress to at least a part of the plurality of strip elements to elastically morph the strip elements, wherein each actuator:
comprises a piezoelectric body which drives the other end of the plurality of strip elements, and a detecting unit which detects a stress applied to the plurality of strip elements by the piezoelectric body,
is connected to at least one of the plurality of strip elements, and
comprises a piston coupled to the piezoelectric body and having a rod member and a coil spring wound around the rod member, the rod member applying the stress along a direction in which the plurality of strip elements extend and around the direction in which the strip elements extend, and
a morphing guide unit guiding the plurality of strip elements in a direction inclined toward a predetermined direction which traverses said surface so as to be elastically morphed toward the predetermined direction when the other end of the plurality of strip elements is shifted so as to come close to the one end by the actuators, wherein
each actuator comprises a shift sensor, and the shift sensor detects a shifted amount of the other end of the at least a part of the plurality of strip elements relative to the one end of the at least a part of the plurality of strip elements.

* * * * *